Patented Apr. 22, 1952

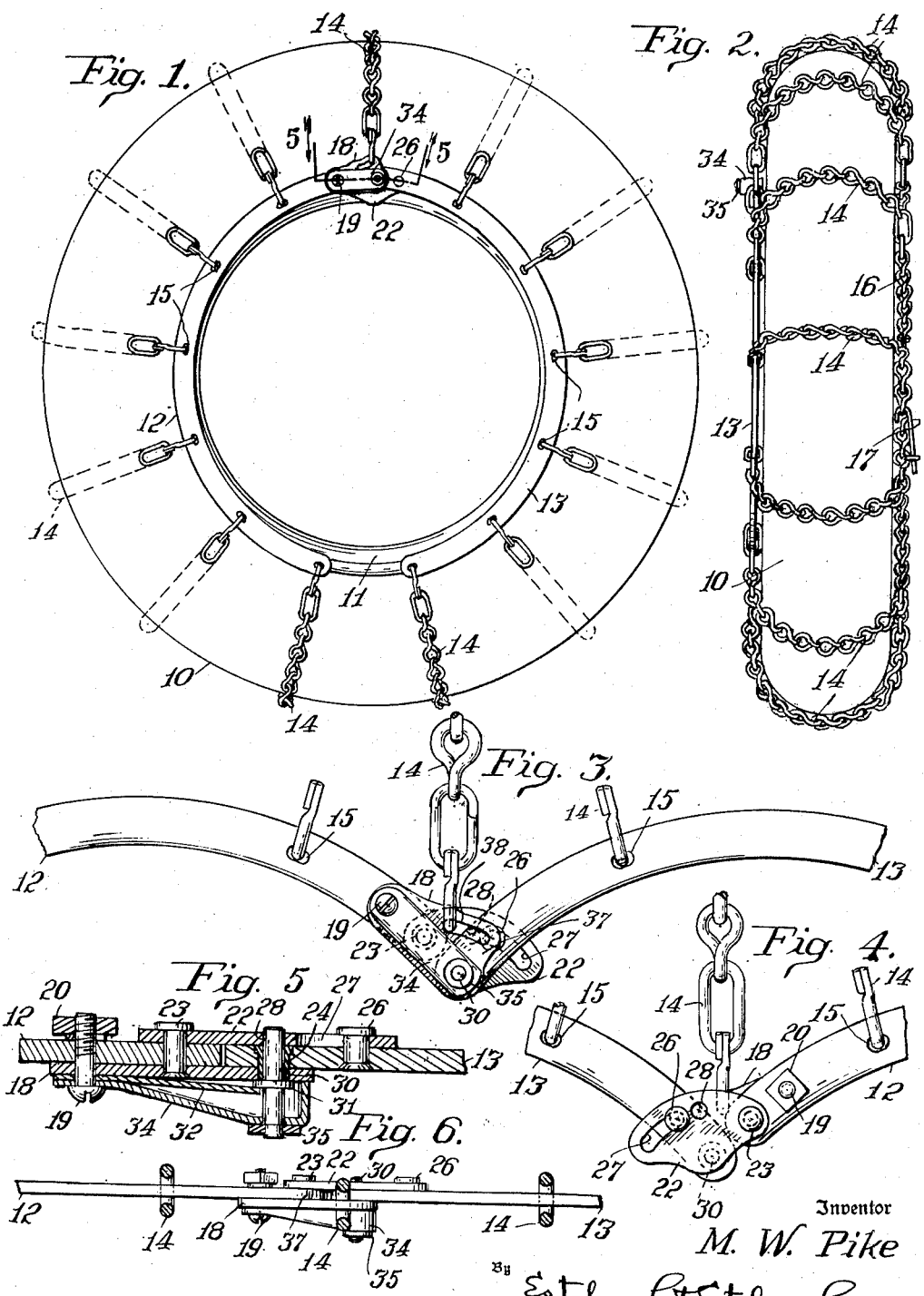

2,594,068

UNITED STATES PATENT OFFICE 2,594,068

ANTISKID TIRE CHAIN

Milow W. Pike, Omaha, Nebr.

Application September 11, 1950, Serial No. 184,308

2 Claims. (Cl. 152—242)

1

This invention relates to an improvement in anti-skid tire chains, and more particularly to the type of tire chains capable of application to a tire without the necessity of raising the wheel from the ground.

The invention consists of a tire chain employing a plurality of cross chains, the ends of which are connected on one side of the wheel to a single side chain which is provided with means for connecting the ends thereof together; and the ends of the cross chains extending to the opposite side of the tire are connected to a sectional ring like member which is provided with means for locking the sectional members together when the sectional members are moved to a position simulating a circle. The tire chain so constructed affording the necessary gripping action on the tire to produce a good friction surface and increase the traction of the tire under adverse weather conditions in traveling over or through mired surfaces.

An object of the invention is to provide an antiskid chain which may be applied or removed from a wheel from a crouching position without the necessity of raising the wheel from the ground.

A further object is to eliminate the necessity of passing any cross chain beneath the tire, as with this invention the proper spacing of the cross chains will take place as the wheel is rotated in the operation of the wheel.

The invention consists in certain novel features of construction and combinations of parts which will be hereinafter described and pointed out in the claims.

In the accompanying drawings:

Figure 1 is a view in side elevation of a tire showing the invention applied to the inner surface of a tire.

Figure 2 is a view in end elevation showing the application of the invention to a tire.

Figure 3 is a detail view in side elevation showing the sectional members of the sectional ring member, showing the position assumed by the ring member in its application to a tire.

Figure 4 is a similar view taken from the opposite side of the ring member to illustrate the manner of connecting the sectional members of the ring together.

Figure 5 is a longitudinal sectional view in detail of the locking mechanism, taken on line 5—5 of Figure 1.

Figure 6 is a view in top plan in detail showing the manner of joining the sectional members of the ring member together.

2

In the drawings 10 represents the tire having a rim portion 11. The tire chain consists of a circular ring like member which is preferably an incomplete circle, and consists of two light weight arcuate shaped metal sections or members 12 and 13. This ring member is preferably positioned on the inner side of the tire adjacent the vehicle body. Connected to the sections or members 12 and 13 are a series of cross chains 14 which extend across the tread of the tire 10. These chains may be attached to the members 12 and 13 in any suitable manner, but, I have shown the end links of the chains passing through openings 15 in the members 12 and 13. The ends of the cross chains 14 extending on the outer surface of the tire are connected to a single side chain 16 and the ends of the side chain are connected together by suitable locking means 17.

The sections or members 12 and 13 are joined together by a hinge joint wherein the section 12 is provided with a plate 18 which is attached thereto by a bolt 19 and nut 20 with a spring washer interposed between the member 12 and nut 20. Disposed on the opposite side of the member 12 from the plate 18 is a link plate 22. The plates 18 and 22 are connected together by a rivet 23 which passes through the plates and member 12 for rigidly holding the plate 18 to the member 12 but allowing the link plate 22 to have a pivotal movement with respect to the member 12. A member 13 is pivotally connected to the plate 18 by means of a steel sleeve 24. A rivet 26 passes through the member 13 and plate 22. The rivet being received in an arcuate slot 27 formed in the plate 22 for limiting the travel of the member 13, see Figure 4, when the members 12 and 13 are swung about the pivot sleeve 24. The plate 22 is provided with a hole or opening 28 adjacent an end of the slot 27. This opening 28 is adapted to register with the opening in the sleeve 24 when the members 12 and 13 have been moved to their innermost position in forming a ring or circle like member as shown in Figure 1. A locking pin 30 is mounted in the plate 18 and projects through the sleeve 24 and into the opening 28 when the members 12 and 13 are in their innermost position as illustrated in Figure 1, for retaining the members against any outward movement. The pin 30 is provided with a collar 31 for limiting its travel into the plates 18, 22 and member 13. A flat spring 32 is secured to the plate 18 by the bolt 19 and is provided with a forked end which engages the pin and collar 31 for urging the pin through the openings in the plates 18 and 22 and sleeve 24. A suitable housing 34 encloses the spring and is connected to the plate 18 by the bolt 19. The pin 30 projects through the housing 34 and is provided with a head 35 for manually withdrawing the pin from engagement with the plate 22 when it is desired to pivot or swing the members 12 and 13 in an outward direction.

The plate 18 is provided with an ear 37, which projects upwardly therefrom and is provided with a slot 38 under which one of the cross chains 14 is connected.

As related, the present tire chain is intended for application to tires without elevating the wheel or tire from the ground, and also to make it adaptable and usable with cars having low fenders or skirts which cover portions of the wheel. Furthermore, it is unnecessary to move the vehicle in order to apply and secure the tire chain to a tire. In applying the tire chain to a wheel the members 12 and 13 of the ring member are preferably swung to the position as illustrated in Figures 3 and 4 after the pin 30 has been withdrawn from the plate 22 to allow the swinging of these members in an outward direction. The ring member is now ready to be positioned along the inner side of the tire with the cross chains extending across the tread and upon application of pressure on either or both of the members 12 and 13 they will be moved toward each other to produce a ring like member, and in so doing the pin 30, which is under tension of the spring 32 will immediately enter the opening 28 in the link plate 22 when this opening is brought into registry with the sleeve 24 thereby securing the ring member in position. The ends of the side chain 16 are now brought together and secured by the locking means 17. The tire chain is now secured upon the wheel or tire and is ready for use.

From the foregoing it will be apparent that the tire chain may be easily and quickly applied and removed from a tire without the necessity of elevating the wheel from the ground. The removal is easily accomplished upon grasping the head 35 of pin 30 and withdrawing the pin from engagement with the link plate 22, which will release the sections 12 and 13 allowing them to be swung outwardly and thereby pulled off from the tire with the cross chains 14.

I claim:

1. A tire chain, comprising a single side chain having end joining means, a pair of members hinged together for swinging movement toward and from each other, a plate fixed to one of said members and pivotally connected to said other member, a link plate pivotally connected to said members having means for limiting the movement of said members, means carried by said first-named plate for engagement with said link plate to hold said members against movement with respect to each other, and cross chains connecting said side chain to said members.

2. A tire chain comprising a single side chain having end joining means, a pair of hinged members, cross chains connecting said side chain to said members, a plate connected to one member, a sleeve pivotally connecting said plate to said other member, a link plate pivotally connecting said members having an opening therein, adapted to register with said sleeve on movement of said members, and means carried by said first-named plate and said sleeve adapted to be projected into said opening of said link plate to lock said members together.

MILOW W. PIKE.

REFERENCES CITED

The following references are of record in the file of this patent:

UNITED STATES PATENTS

| Number | Name | Date |
|---|---|---|
| 393,929 | Shaw | Dec. 4, 1888 |
| 2,396,532 | Roff | Oct. 16, 1942 |